United States Patent
Zubieta

[11] 4,008,883
[45] Feb. 22, 1977

[54] BLENDER

[76] Inventor: Robert Frutos Zubieta, 1101 Aviation Blvd., Hermosa Beach, Calif. 90254

[22] Filed: June 11, 1975

[21] Appl. No.: 585,853

[52] U.S. Cl. .................. 259/108; 259/DIG. 16
[51] Int. Cl.² .................. B01F 5/16; B01F 7/26
[58] Field of Search .......... 259/107, 108, DIG. 16, 259/7, 8, 95, 103, 106, 111, 113, 114, 115; 308/139, 27–33

[56] References Cited

UNITED STATES PATENTS

| | | | |
|---|---|---|---|
| 633,476 | 9/1899 | Northam | 308/28 |
| 871,906 | 11/1907 | Avery et al. | 259/97 |
| 1,300,560 | 4/1919 | Bicknell | 308/28 |
| 1,982,059 | 11/1934 | Lawler | 259/108 |
| 2,144,715 | 1/1939 | Dalzell | 259/108 |
| 2,258,830 | 10/1941 | Vollrath | 259/106 |
| 2,963,106 | 12/1960 | Sampietro | 308/28 |
| 3,297,309 | 1/1967 | Adams | 259/115 |
| 3,299,924 | 1/1967 | Hanschitz | 259/108 |
| 3,486,741 | 12/1969 | Midgette | 259/107 |
| 3,606,260 | 9/1971 | Rubin | 259/107 |
| 3,856,272 | 12/1974 | Ravitts | 259/95 |

FOREIGN PATENTS OR APPLICATIONS

R5,859   1/1956   Germany ................ 259/108

*Primary Examiner* — Harry N. Haroian
*Attorney, Agent, or Firm* — Lindenberg, Freilich, Wasserman, Rosen & Fernandez

[57] ABSTRACT

A portable blender which can be dipped into a vat containing liquid with vegetables or fruit, including a tube with slots near the bottom, a motor-driven shaft mounted on sealed precision bearings at the upper portion of the tube, a group of blades fixed to the shaft at a location even with the openings at the bottom of the shaft, and one or two stabilizer bushings disposed about the lower end of the shaft. Each stabilizer bushing has a hole which is large enough that the shaft normally does not contact the bushing and that blended material can flow between the bushing and rotating shaft, and yet each bushing is small enough that it prevents more than a small amount of sideward shaft deflection.

2 Claims, 7 Drawing Figures

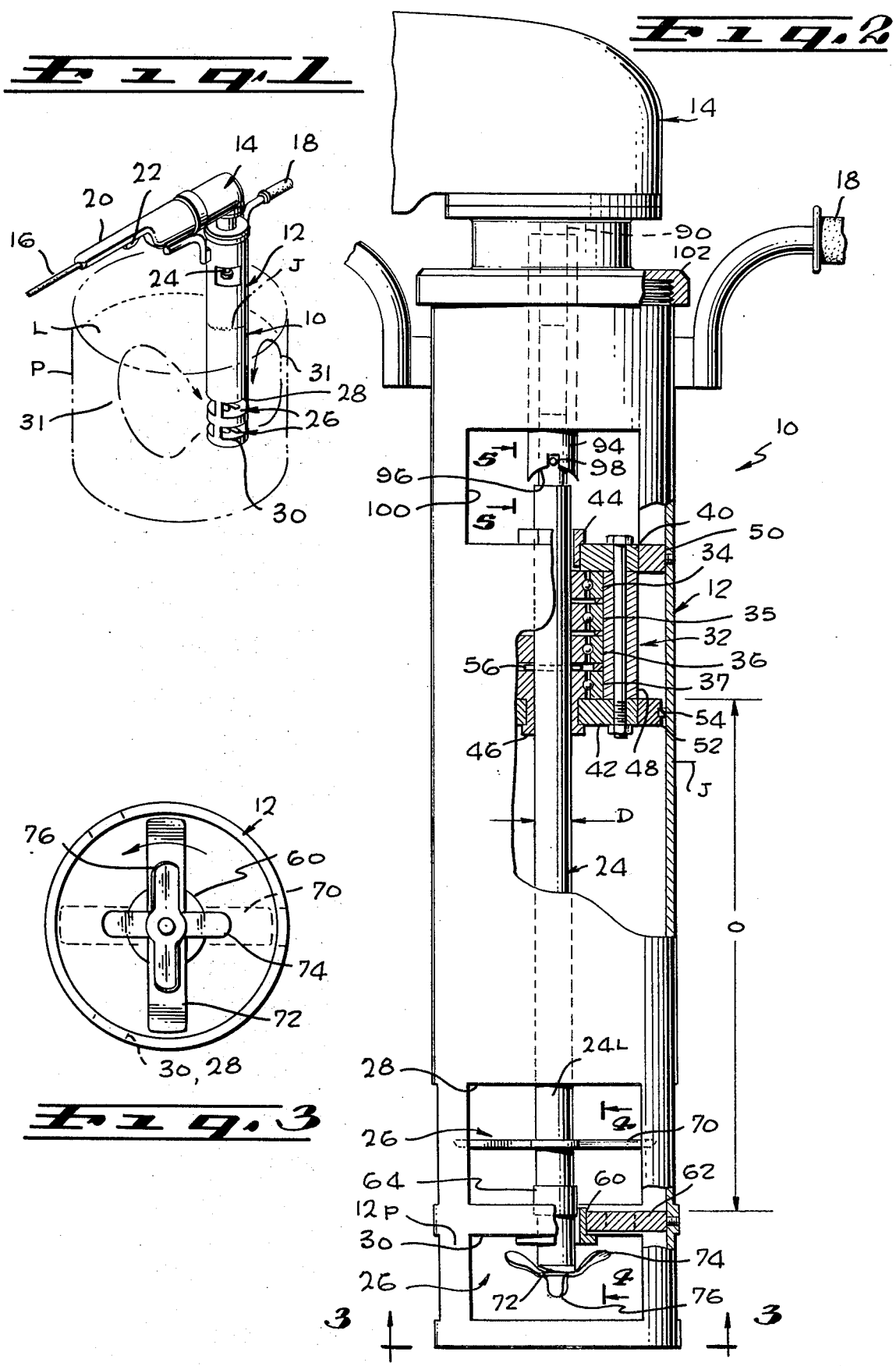

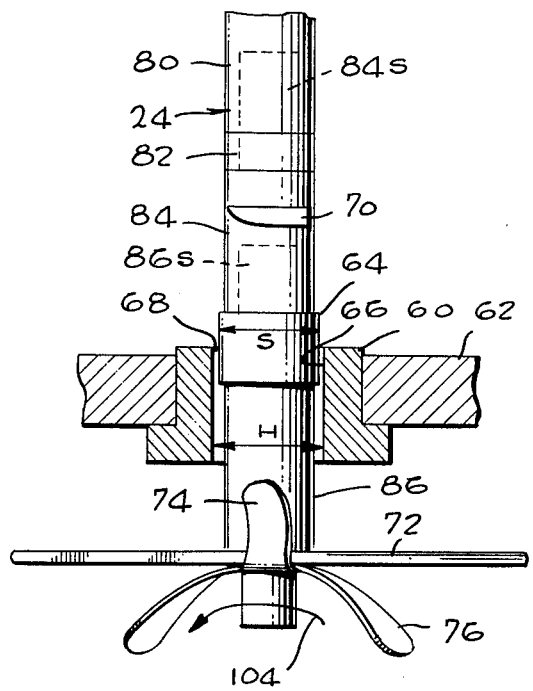
Fig. 4
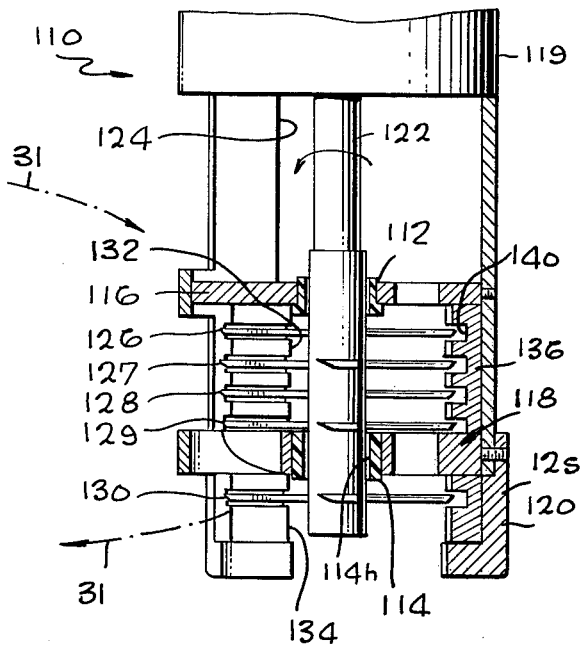
Fig. 6
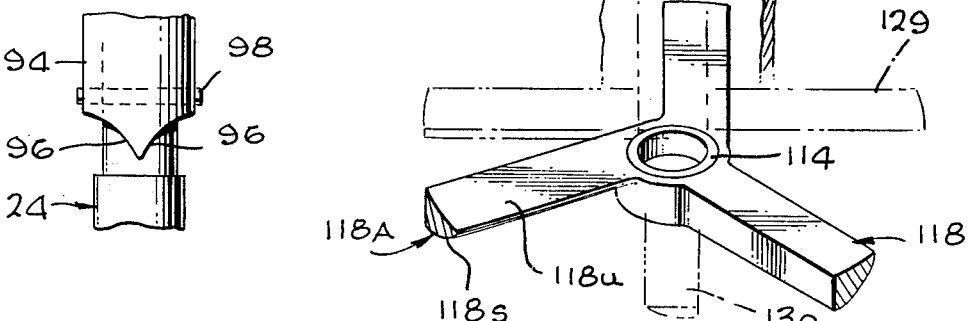
Fig. 5
Fig. 7

BLENDER

BACKGROUND OF THE INVENTION

This invention relates to blenders and similar devices.

The preparation of food in a restaurant often involves the blending of considerable quantities of hot or cold liquids. For example, it may be necessary to blend perhaps 40 gallons of tomato sauce ingredients which are at a temperature approximately that of boiling water. A blender can be constructed with a long shaft having an upper end connected to a high speed motor and a lower end carrying blending blades. However, it is necessary to provide high speed bearings for the shaft so that it turns in a stable manner at a high speed such as 5,000 rpm, and to isolate the bearings from the hot or cold liquid to be blended. Bearings immersed in liquid can be protected by seals, but it has been found that in hot liquids the seals expand and rub hard on the shaft, which causes the seals to impart an undesirable taste to the food. Also, liquid may seep through the bearing seals and impart the undesirable taste of bearing grease to the food. A relatively compact blender which could be carried and inserted into a pot containing largely liquid material to be blended, and which could be easily operated in a safe manner to blend even hot liquids without the blender imparting a taste to the liquids, would be of great aid in the preparation of food and other materials requiring a high degree of purity.

SUMMARY OF THE INVENTION

In accordance with one embodiment of the present invention, a blender is provided which is easily utilized and which does not impart a taste to even hot liquids that are blended. The blender includes a motor-driven shaft which extends axially along a tube, the shaft carrying blender blades at its lower end and the tube having openings around the blender blades to pass fluid thereto. The upper portion of the shaft is rotatably mounted on a series of sealed precision bearings held in the tube, while the lower end of the shaft is devoid of close bearing support but instead is encircled only by one or two stabilizer bushings. Each stabilizer bushing has a hole which is large enough that the shaft does not contact the walls of the bushing unless the shaft is sidewardly deflected, and so that liquid can flow through the clearance region between the shaft and bushing. The bushing hole is small enough that the shaft contacts it if the shaft is displaced a small amount well within its elastic limit. As a result, the shaft does not continuously rub on the bushings, and yet the bushings prevent the shaft from deflecting and whipping out of control. The tube has openings above and below the bushings, and the shaft carries blades which are oriented to urge fluid flow through the bushing holes.

The novel features that are considered characteristic of this invention are set forth with particularity in the appended claims. The invention will be best understood from the following description when read in connection with the accompanying drawings.

BRIEF DESCRIPTION OF THE DRAWINGS

FIG. 1 is a perspective view of a blender constructed in accordance with the present invention, showing its manner of usage in a pot of material to be blended;

FIG. 2 is a partially sectional, side elevation view of the blender in FIG. 1;

FIG. 3 is a view taken on the line 3—3 of FIG. 2;

FIG. 4 is a view taken on the line 4—4 of FIG. 2;

FIG. 5 is a view taken on the line 5—5 of FIG. 2;

FIG. 6 is a partial side view of a blender constructed in accordance with another embodiment of the invention; and FIG. 7 is a perspective view of a holder member of the blender of FIG. 6.

DESCRIPTION OF THE PREFERRED EMBODIMENTS

FIG. 1 illustrates the blender 10 whose lower part can be immersed to a level J in a primarily liquid material L contained in a vat or large pot P, to blend the material. The blender includes a pipe or tube 12 of less than one-fifth the diameter of the typical pot in which it is to be used, and also includes a motor drive or motor 14 which is mounted on top of the tube and which has a cord 16 that can be plugged into an electrical outlet. A workman grasps a handle 18 on the tube and another handle 20 on the motor and depresses a trigger switch 22 with his finger to operate the blender. The motor then turns a shaft 24 mounted within the tube, and having blades 26 near the bottom of the tube at the level of openings 28, 30 in the tube, so that material can pass through the tube openings where it is cut by the blades. The blender is normally totally immersed in primarily liquid material, and its blades turn at a high speed which is greater than 1,000 rpm, to create a strong flow or wave of material as indicated at 31 that carries outlying material into the blender blades.

As illustrated in FIGS. 2 – 4, the tube 12 contains a bearing assembly 32 which includes four precision sealed ball bearings 34 – 37 that rotatably support the upper portion of the shaft 24. Although two bearings would suffice, the additional bearings increase safety, to prevent injury if one or two bearings fail, as well as aiding in smooth operation. The bearings are held between a pair of plates 40, 42, which contain seals 44, 46 to keep out liquid food or other foreign material, and within a cylinder 48 which is attached to the end plates. An upper mounting ring 50 which is press-fitted and also held by screws onto the upper plate 40 is accurately held within the tube 12. A lower ring 52 which is press-fitted onto the lower plate 42 is sealed by an elastomeric O-ring 54 to the inner walls of the tube. A pin 56 extending through the shaft and located between a pair of the bearings 36, 37, limits vertical movement of the shaft with respect to the tube.

The lower portion 24L of the shaft is surrounded by a stabilizer in the form of a bushing 60 which surrounds the shaft and is held on a plate 62 that is mounted in the tube between the two sets of openings 28, 30 formed in the tube. The shaft has a slightly enlarged portion 64 which lies within the upper portion of the bushing. The hole 66 in the bushing is made large enough so that the largest shaft portion 64 therein does not make constant contact with the bushing. Instead, the function of the bushing is to prevent the shaft from bending far enough from a straight configuration that the shaft or blades thereon would be damaged. To this end, the diameter H (FIG. 4) of the hole 66 should be made considerably larger, such as at least 1% larger, than the diameter S of the largest shaft portion therewithin. In one blender which has been made, a diameter S of the shaft portion 64 was 11/16 inch while the diameter H of the hole 66 was ¾ inch, leaving a clearance at 68 of 1/32 inch, or in other words, about 5% of the diameter of the shaft portion 64. The precision bearings 34 – 37 permit only a negligible sideward movements of the shaft portion therein of a fraction of 1% of the shaft diameter, such precision normally being required for shafts that are to rotate at high speeds.

The precision bearings 34 – 37 are accurately positioned to hold the shaft (when undeflected) close to the center of the stabilizing bushing hole 66. As a result, the shaft portion 64 does not touch the walls of the bushing hole 66 when the shaft is not forcefully deflected. During operation of the blender, when the blender blades will engage different materials in the mixture to be blended, the materials may cause sideward deflection of the shaft. If the long shaft portion extending from the bearings were completely free of restraint against bending, then the shaft might deflect to one side far enough that it or the blades become damaged. The stabilizer bushing prevents such a degree of shaft deflection, and yet does not constantly engage the shaft in the manner of a bearing. A bearing for high speed operation normally would have to be isolated from the material being blended, as compared to the bushing which seldom actually contacts the shaft and which therefore does not have to be constructed for constant low-friction engagement with the shaft.

The shaft carries several blades at its lower end. These include a pair of upper blending or cutting blades 70 which lie within the openings 28 and a pair of lower blending or cutting blades 72 which lie within the opening 30. The upper openings 28 are formed by three slots in the tube, while the lower openings 30 are also formed by three slots. In addition to the large cutting blades 70, 72, a pair of auxiliary lubricating blades 74 and a pair of auxiliary feeder blades 76 are provided on the shaft. The lubricating blades 74 are positioned a small distance from the bushing 60 and are designed to draw fluid downwardly through the bushing hole 66 in the clearance space 68 between the shaft and bushing. It has been found that smoother operation, e.g. less vibration of the blender, is achieved by using such blades to draw a stream of liquid through the stabilizer bushing hole. The feeder blades 76 are configured to urge fluid to flow upwardly into the lower cutting blades 72.

The shaft 12 includes a solid rod 80 extending along most of the shaft length, and several separate parts 82, 84, and 86 (FIG. 4) below the rod. The shaft part 84 is welded to the upper cutting blades 70 and has a threaded shank 84s which is threaded into a hole at the bottom of the shaft rod 80. A spacer ring 82 locates the shaft part 84 at the desired height. The lowest shaft part 86 is welded to the lower cutting blades 72 and to the auxiliary blades 74 and 76, and it also has a threaded shank 86s which is received in a hole of the shaft part 84.

The motor assembly 14 is designed to permit rapid attachment and detachment from the tube 12. The motor 14 has an output shaft or spindle 90 and a tubular coupling 94 which is attached to the output spindle 90. The coupling 94 and blending shaft 24 are designed so that the upper end of the blending shaft can be received in the coupling. The coupling has a pair of cutouts 96 on either side thereof, while the shaft 24 has a roll pin 98 whose projecting ends can be received in the coupling cut-outs. The cut-outs 96 include slots at the top which closely receive the roll pin to provide a secure connection. A workman can connect the motor 14 to the rest of the blender by projecting the motor output spindle with the coupling thereon, into the top of the tube 12 so that the blending shaft 24 is received in the coupling with the roll pin 98 received in the slots at the top of the coupling cut-outs. The tube 12 is provided with a pair of openings 100 on either side thereof to permit a workman to view the connected regions of the blender shaft and coupling, so that he can be sure they are properly connected before starting the motor. The motor carries a ring 102 with internal threads that can threadably receive external threads formed at the top of the tube 12, to hold the motor securely to the tube. The motor and tube can be easily connected and disconnected, to facilitate storage and carrying of the blender. The motor 14 is similar to a heavy duty rotary sander with a fitting assembly 104 for connection to the tube 12.

The blender is typically utilized by immersing the lower portion of the tube 12 in a pot of material to be blended. The depth of material should be small enough that the top of the fluid is considerably below the opening 100 in the tube when the bottom of the tube rests on the bottom of the pot. If a hot liquid is being blended, and if the fluid level is near the level of the bearings 34 – 37, then more heat will reach the bearings and seals, and provisions might have to be made to prevent damage from expansion due to heating. It is also desirable to maintain a fluid level within the tube 12 which is appreciably below the seal 46 so that the liquid being blended does not splash onto the lower plate 52, or at least that splashing is minimized to minimize the amount of blender cleaning. The lower plate 42 as well as the ring 52 and the O-ring 54 thereon form a substantially air-tight seal. Accordingly, when the tube is immersed in liquid, the liquid level within the tube 12 does not rise as high as liquid outside the tube, and therefore the liquid within the tube is maintained further from the plate 42 and 46. In spite of the almost airtight sealing at the plate 42, the fluid level can still rise within the tube as material is being blended. To minimize the fluid level rise within tube 12, the upper blending blades 70 are formed to urge fluid downwardly so that fluid does not rise in the tube. It can be seen in FIG. 4 that the upper blade 70 has a lower surface which is angled from the horizontal so that when the shaft rotates in its normal direction of rotation, as indicated by arrow 104, liquid is urged downwardly. Of course, the need to isolate the bearings and seals such as 46 from hot liquid being blended means that the shaft includes a long portion of a length 0, which is not supported by bearings in constant contact with the shaft, which is a major reason why the stabilizing bushing 60 is desirable.

A blender of the type described above has been constructed with a shaft 24 of a diameter D of ⅝ inch along most of its length, and with a shaft overhang O of approximately ten inches between the lowermost bearing 37 and the stabilizing bushing 60. The shaft was contained within a tube 12 of about four inches outer diameter. The hole 66 of the bushing had a diameter H of ¾ (0.750) inch, while the shaft portion 64 had an outer diameter S of 11/16 (0.688) inch, with both of them being constructed of stainless steel. The motor 14 drove the shaft at a speed of approximately 5,000 rpm. It was found that the blender operated effectively and with relatively low vibration, to blend a variety of materials, such as the ingredients for tomato sauce at the temperature of boiling water.

FIGS. 6 and 7 illustrate a blender 110 constructed in accordance with another embodiment of the invention, and which has been found to operate very effectively and with almost no vibration. The blender 110 is of substantially the same size and is similar to the blender of FIGS. 1 – 5 except for details of its lower portion. The blender 110 includes two nylon bushings 112,114 spaced along the length of the shaft, with the upper bushing 112 held by a spider or multi-arm holder 116 and with the lower bushing 114 held by another spider or multi-arm holder 118. The tube 119 also includes three lower legs 120. The shaft 122 is devoid of blades at upper openings 124, but has four axially spaced sets of blades 126 – 129 at the level of middle openings 132 and has another set of blades 130 at lower openings 134 that are formed between the bottom legs 120. The blade sets 126, 128 and 129 each include two blades, while blade sets 127 and 130 each include four blades. The blender also includes grooved knife members 136 mounted around the upper blades 126 – 129 and lower blades 130.

The spider holder 118 forms large spaces between its arms 118A, through which blended material can pass. This facilitates the generation of a flow of material, indicated by arrow 31, through the entire pot, through the circumferentially spaced openings 132, past the blender blades and out through the set of circumferentially spaced openings 134. Each of the blades 126 – 130 urges the material to move downwardly to help create this flow of material in the pot, as well as to create a flow of fluid through the bushings 112, 114. The arms of the bushing are also formed with deflecting lower surfaces 118s (FIG. 7) that are angled to direct the material downwardly. One of the blade sets 129 is located close to the upper surface 118u of the arms, such as about 1/16th inch away, so that pieces of material extending between the blades 126 and holder arms 118 will be cut.

The grooved knife members 136 and the inside of the legs 120 form grooves 140 which lie close to the periphery of the blades. It is found that the grooved knife members aid in the cutting of thin sheet-like pieces of material, such as the skins of tomatoes and other fruits and vegetables which have been heretofore very difficult to cut into small bits. A blender constructed as shown at 110 has been constructed, and has been found to operate very effectively in blending even difficult-to-blend materials, and with almost no vibration.

Although particular embodiments of the invention have been described and illustrated herein, it is recognized that modifications and variations may readily occur to those skilled in the art and consequently it is intended that the claims be interpreted to cover such modifications and equivalents.

What is claimed is:
1. A blender comprising:
a tube (12 or 119) having upper and lower portions;
a shaft (24 or 122) positioned in said tube to extend substantially axially therealong;
a motor (14) coupled to said shaft to turn it in a predetermined direction;
a bearing assembly (32) including a plurality of bearings mounted on said tube and rotatably supporting said shaft;
said tube having a first plurality of circumferentially spaced openings (30 or 125) near the lower end thereof and a second plurality of circumferentially-spaced openings (28 or 123) located above said first openings;
a plurality of blades (24 or 126 – 130) mounted on said shaft, some of said blades mounted at the level of said first plurality of openings in said tube and some of said blades mounted at the level of said second plurality of openings in said tube;
a bushing support (62 or 118) mounted in said tube between said first and second openings;
a stabilizing bushing (60 or 114) mounted on said bushing support and having a bushing hole (66 or 114h) through which said shaft extends, said bearing assembly holding said shaft so it extends through the center of said bushing hole and said bushing hole being of a size which provides a clearance between the shaft and bushing of between 0.016 and 0.064 inch so that said shaft does not touch the walls of the bushing hole when the shaft is undeflected, said bushing hole being small enough that the shaft touches the wall of the bushing hole during resilient sideward deflection of the shaft;
at least two blades (74 or 130) of said plurality of blades shaped to urge fluid through said stabilizing bushing hole when said shaft is rotated by said motor.

2. A blender comprising:
a tube having upper and lower end portions, and having a plurality of slots in its lower end portion;
a shaft extending substantially axially along said tube, with a lower portion which extends at least to the level of said slots in said tube;
a plurality of blender blades fixed to said lower portion of said shaft at substantially said level of said slots in said tube;
motor means coupled to the upper portion of said shaft to rotate it; and
a stabilizer mounted on the lower portion of said tube, including a bushing having a hole receiving the lower portion of said shaft, said hole being sufficiently larger than said shaft to provide a clearance around said shaft of more than one percent of the shaft diameter, and said stabilizer including a spider holder for holding said bushing in said tube, said tube having slots above and below said spider holder;
said spider holder having a plurality of angularly spaced arms extending in a largely radial direction between said bushing and said tube, and lying immediately below said blades, each of said arms having an edge lying close to the path of said blades and having a downwardly inclined surface extending from said edge to deflect downwardly any food hurled by a blade thereagainst.

* * * * *